United States Patent
Koehl et al.

(10) Patent No.: US 7,206,308 B2
(45) Date of Patent: Apr. 17, 2007

(54) METHOD OF PROVIDING A NON-BLOCKING ROUTING NETWORK

(75) Inventors: Juergen Koehl, Weil im Schoenbuch (DE); Ronald Peter Luijten, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 1072 days.

(21) Appl. No.: 10/290,645

(22) Filed: Nov. 8, 2002

(65) Prior Publication Data
US 2003/0117947 A1 Jun. 26, 2003

(30) Foreign Application Priority Data
Dec. 22, 2001 (EP) ................. 01130760

(51) Int. Cl.
*H04Q 11/00* (2006.01)
(52) U.S. Cl. .................................. 370/386
(58) Field of Classification Search ............. None
See application file for complete search history.

(56) References Cited

U.S. PATENT DOCUMENTS

| 5,864,552 | A | * | 1/1999 | Du et al. ............ 370/388 |
| 5,933,428 | A | * | 8/1999 | Olnowich .......... 370/388 |
| 6,628,662 | B1 | * | 9/2003 | Blackmon et al. .... 370/461 |
| 6,876,650 | B2 | * | 4/2005 | McCrosky et al. ... 370/388 |
| 6,982,974 | B1 | * | 1/2006 | Saleh et al. ........ 370/386 |

* cited by examiner

*Primary Examiner*—Chi Pham
*Assistant Examiner*—Anh-Vu Ly
(74) *Attorney, Agent, or Firm*—John E. Campbell; Floyd A. Gonzalez

(57) ABSTRACT

Method and apparatus for providing a non-blocking routing network for establishing arbitrary connections between n primary nodes ($m_0, \ldots, m_{n-1}$) and $N \geq n$ secondary nodes ($r_0, \ldots, r_{N-1}$). The routing network requires less physical connections than a corresponding Clos routing network while having small transmission delays. One embodiment of the invention provides a routing network that is well suited for direct on-chip implementation due to the matrix structure of the routing network.

22 Claims, 7 Drawing Sheets

METHOD OF PROVIDING A NON-BLOCKING ROUTING NETWORK

BACKGROUND OF THE INVENTION

The present invention relates to a method of providing a non-blocking routing network having a primary level with n primary nodes and a secondary level with N≧n secondary nodes and an intermediate level with s intermediate nodes.

A routing network usually consists of at least a primary level having n primary nodes and a secondary level having N secondary nodes. The routing network can establish a link between any primary node and an arbitrary secondary node. In a first approach, this is accomplished by physically connecting each of the n primary nodes to each of the N secondary nodes, which represents the trivial solution requiring n*N physical connections. This trivial solution is obviously non-blocking.

In a second approach, intermediate levels are added to the routing network. With these intermediate levels, it is possible to reduce the number of physical connections compared to the trivial solution while still being able to establish a link between any primary node and an arbitrary secondary node. It is also possible to provide non-blocking routing networks with intermediate levels, but the transmission delay for transferring data from a primary node to a secondary node over a link increases with the number of intermediate levels.

SUMMARY OF THE INVENTION

Accordingly, it is an object of the present invention to propose a method of providing a non-blocking routing network with a reduced number of physical connections and a small transmission delay.

According to the present invention, this object is achieved by (a) partitioning said intermediate level to obtain p copies $I\_u\_v$, u=1, . . . , p; p>0 of q subsets $I\_v$, u=constant, v=1, . . . , q; q>1 such that the relation $p*q \geq \sqrt{n}$ is satisfied, wherein sqrt(n) denotes the square root of n, (b) choosing functions $f\_1, \ldots, f\_q$ defined for said secondary nodes of said secondary level for mapping said secondary nodes to said intermediate level such that (b1) $f\_a$, a=1 . . . , q, is an element of $I\_a$, and such that (b2) the identity of a first secondary node $r\_y$ with a second secondary note $r\_z$ follows from $f\_a(r\_y)=f\_a(r\_z)$ and $f\_b(r\_y)=f\_b(r\_z)$ for a<>b, (c) connecting each secondary node to p*q intermediate nodes, wherein for a distinct secondary node $r\_d$ said p*q intermediate nodes are given by the mapping of the functions $f\_1(r\_d)^1, \ldots, f\_1(r\_d)^p, \ldots, f\_q(r\_d)^1, \ldots f\_q(r\_d)^p$, wherein $f\_j(\ )^k$ denotes a mapping to the j-th subset $I\_k\_j$ of the k-th copy $I\_j$ of said q subsets, (d) connecting each primary node to said s intermediate nodes.

The proposed method yields a routing network requiring fewer physical connections than the trivial solution. The routing network so obtained even requires fewer physical connections than a corresponding Clos network.

Additionally, said routing network is non-blocking. Since there is only one intermediate level needed for constructing the routing network according to the present invention, the transmission delay is small, too. Hence, the routing network provided by the method according to the invention is ideally suited for on-chip integration of large switch structures e.g. for connecting multiprocessor systems to memory elements and other shared resources.

The basic idea of the invention is to first introduce an intermediate level with s intermediate nodes, wherein the value s is initially unknown. The parameters p, q describe how to partition the intermediate level for proceeding with step (b). The values of p, q can be chosen arbitrarily, provided the relation $p*q \geq \sqrt{n}$ is satisfied. This is necessary for the non-blocking property of the routing network and can be derived from Hall's theorem.

Secondly, q functions $f\_1, \ldots, f\_q$ are selected. These functions $f\_1, \ldots, f\_q$ perform a mapping of a secondary node to the intermediate level thereby defining a rule for physically connecting a secondary node to intermediate nodes. An important criterion for choosing the q functions $f\_1, \ldots, f\_q$ is a uniform distribution of physical connections from the secondary level to the intermediate level, i.e. a distinct secondary node should be mapped to different intermediate nodes to avoid hotspots and the like within the routing network.

The routing network is constructed by connecting each primary node to said s intermediate nodes, wherein the value of s is obtained from evaluating the q functions $f\_1, \ldots, f\_q$. Finally, each secondary node is connected to intermediate nodes according to step (c) of the method.

In practice, routing networks obtained with the method according to the invention require an extraordinary small number of physical connections. More precisely, the number of physical connections is proportional to the square root of the number N of secondary nodes, which leads to even fewer physical connections than required in Clos networks, for example.

An advantageous embodiment of the present invention is characterized by providing q prime numbers $pn\_1, \ldots, pn\_q$ in step (b) such that the relation $pn\_a*pn\_b \geq N*(1-\delta\_a\_b)$, a=1, . . . , q, b=1, . . . q, is satisfied, wherein $\delta\_a\_b$ is Kronecker's symbol, the method being further characterized by choosing q functions $f\_a(x)$, a=1, . . . , q, to be the residue class of x modulo $pn\_a$, wherein x denotes an arbitrary secondary node, and characterized by using the mapping of said functions $f\_a(x)$, a=1, . . . , q, for connecting in step c.

The prime numbers $pn\_1, \ldots, pn\_q$ in connection with the modulo functions provide for a suitable uniform distribution of physical connections from the secondary level to the intermediate level. The relation $pn\_a*pn\_b \geq N*(1-\delta\_a\_b)$ must be satisfied and implies that, if 1. a first secondary node $r\_y$ is mapped by a first function $f\_a(x)$ to the same first intermediate node as a second secondary node $r\_z$ by said first function $f\_a(x)$, and at the same time
2. the first secondary node $r\_y$ is mapped by a second function $f\_b(x)$ to the same second intermediate node as the second secondary node $r\_z$ by said second function $f\_b(x)$, too, the difference $r\_y-r\_x$ is either zero or a multiple of $pn\_a*pn\_b$. According to the above relation, the absolute value of said multiple is larger than N.

If the above relation is not satisfied, it is possible that two different intermediate nodes are determined to have physical connections to largely identical subsets of secondary nodes thus violating the requirement for uniform distribution of physical connections. An example for such a situation is given in the detailed description of embodiments of the invention.

If the above relation is satisfied, a suitable uniform distribution is ensured.

Another advantageous embodiment of the present invention is characterized by choosing p or/and q or/and possibly said q prime numbers pn_1, . . . , pn_q such that the number of connections between said intermediate level and said secondary level is minimal.

The number s of intermediate nodes is obtained by evaluating the mapping functions f_a(x), a=1, . . . , q, wherein choosing a value for q determines the number of mapping functions. In practice, different combinations of p and q and prime numbers pn_1, . . . , pn_q usually yield a different number s of intermediate nodes and a different number of physical connections, accordingly.

The method according to the invention enables optimizing the values of p, q, and the prime numbers pn_1, . . . pn_q with little effort and thereby contributes to further reducing the number of physical connections without any compromise regarding transmission delay, complexity of the method and the resulting routing network, respectively.

Another advantageous embodiment of the present invention is characterized by choosing the following values: n=32, N=1024. These values for n, N enable a routing network obtained to be integrated in existing systems and to be combined to larger routing networks conforming to standard values for the number of input/output nodes.

Yet another advantageous embodiment of the present invention is characterized by
  arranging said N secondary nodes in a matrix with m_r rows and m_c columns,
  performing step (a) with q=2,
  choosing a function f_1(r, c) that maps a secondary node r_r1_c1 of the r1-th row and the c1-th column of said matrix to the value r1, choosing a function f_2(r, c) that maps said secondary node r_r1_c1 of the r1-th row and the c1-th column of said matrix to the value c1,
  connecting each secondary node to p*2 intermediate nodes, wherein for a distinct secondary node r_r1_c1 said p*2 intermediate nodes are given by the mapping of the functions $f\_1(r\_r1\_c1)^1, \ldots, f\_1(r\_r1\_c1)^p$, $f\_2(r\_r1_{\_c1})^1, \ldots f\_2(r\_r1\_c1)^p$, wherein $f\_j(\ )^k$ denotes a mapping to the j-th subset I_k_j of the k-th copy I_k of said q subsets.

The particular advantage of this embodiment is based on the matrix structure of the secondary level which allows an easy hardware implementation by simply transferring a scheme used for construction to semiconductor structures.

A further advantageous embodiment of the present invention is characterized by
  extending said intermediate level by adding an additional mapping from said secondary nodes to said intermediate level thereby defining an additional set of intermediate nodes.

This embodiment of the method according to the present invention leads to a routing network which is very well suited for implementing fast routing algorithms.

Especially, in a further advantageous embodiment, choosing said additional mapping such that an arbitrary secondary node is also mapped to said additional set of intermediate nodes, wherein said additional mapping maps said arbitrary secondary node to an intermediate node that corresponds to the column of said secondary node in said matrix enables to apply a specific routing algorithm requiring only few steps even in case of maximum traffic.

A further advantageous embodiment of the present invention concerning a method of choosing connections for a set of n' secondary nodes to intermediate nodes in a routing network, wherein four intermediate nodes V_c_1, . . . , V_c_4 are assigned to the c-th column of said matrix with c=0, . . . , m_c−1, and wherein three intermediate nodes H_r_1, . . . , H_r_3 are assigned to the r-th row of said matrix with r=0, . . . , m_r−1, is characterized by the following steps:
  determining a group of columns of said matrix which contain four or less secondary nodes of said set
  for each column c found to be in said group of columns:
    assigning said four or less secondary nodes to the corresponding number of corresponding intermediate nodes V_c_1, . . . , V_c_4 of the respective column c, and
    marking said column c as processed thereby reducing the number of remaining secondary nodes and defining a reduced matrix,
  determining a group of rows of said reduced matrix which contain three or less secondary nodes of said set,
  for each row r found to be in said group of rows:
    assigning said three or less secondary nodes to the corresponding number of corresponding intermediate nodes H_r_1, . . . , H_r_3 of the respective row r, and
    marking said row r as processed thereby further reducing said reduced matrix and the number of remaining secondary nodes,
  obtaining said reduced matrix comprising eight or less rows and six or less columns of remaining secondary nodes that have not yet been assigned to intermediate nodes,
  assigning said remaining secondary nodes to intermediate nodes according to a predefined scheme.

Each of these few steps contains very simple operations that can be implemented in a microprocessor. Due to its simplicity, based on step-by-step reducing on a per row/column base the number of secondary nodes to be processed, the method according to the invention does not require a high-performance microprocessor which is of economic advantage. Furthermore, there is no need to resort to complex matching algorithms for routing such as the Edmonds-Karp algorithm or the Hopcroft-Carp algorithm requiring many machine cycles.

Furthermore, a combined routing network consisting of at least a first and a second routing network as obtained by the method according to one of the claims 1 to 9 is disclosed, which is characterized in that said first routing network and said second routing network have the same number of secondary nodes, and in that said first and second routing network are connected to each other via at least one secondary level.

BRIEF DESCRIPTION OF THE DRAWINGS

These and other objects will be apparent to one skilled in the art from the following detailed description of the invention taken in conjunction with the accompanying drawings in which.

DESCRIPTION OF THE PREFERRED EMBODIMENT

Figure 1:
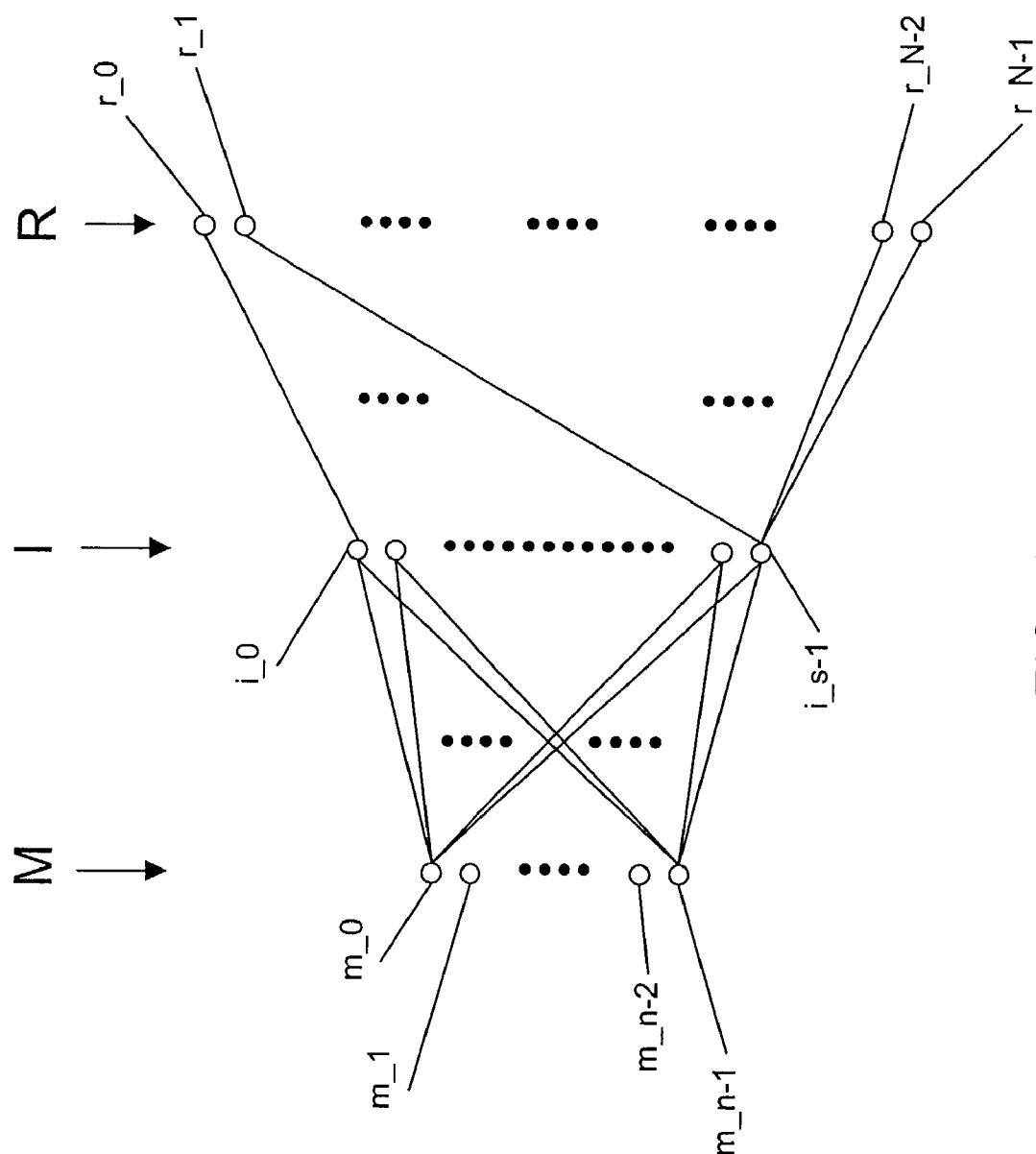
FIG. 1 shows a routing network with one intermediate level I.

In FIG. 1, a routing network with a primary level M, an intermediate level I and a secondary level R is presented. The primary level M comprises n primary nodes m_0, m_1, . . . , m_n−1, whereas the intermediate level I comprises s intermediate nodes i_0, i_1, . . . i_s−1. The secondary level R comprises N secondary nodes r_0, r_1, . . . , r_N−1.

A node can be physically connected to another node of an adjacent level, which is symbolized by a line connecting the respective nodes. For example, the secondary node r_N−1 is connected to the intermediate node i_s−1, as is the secondary node r_N−2. The dots in FIG. 1 as well as in the other figures represent further nodes and connections, which are omitted for clarity. In the further text, the term connection is used synonymously with the term physical connection.

In FIG. 1, each of the n primary nodes m_0, m_1, m_n−1 is connected to each of the s intermediate nodes i_0, i_1, . . . i_s−1. Hence, for connecting the primary level M to the intermediate level I in this way, n*s connections are required.

The intermediate level I is connected to the secondary level R according to a method which is explained with reference to FIG. 2 and FIG. 4.

Figure 2:
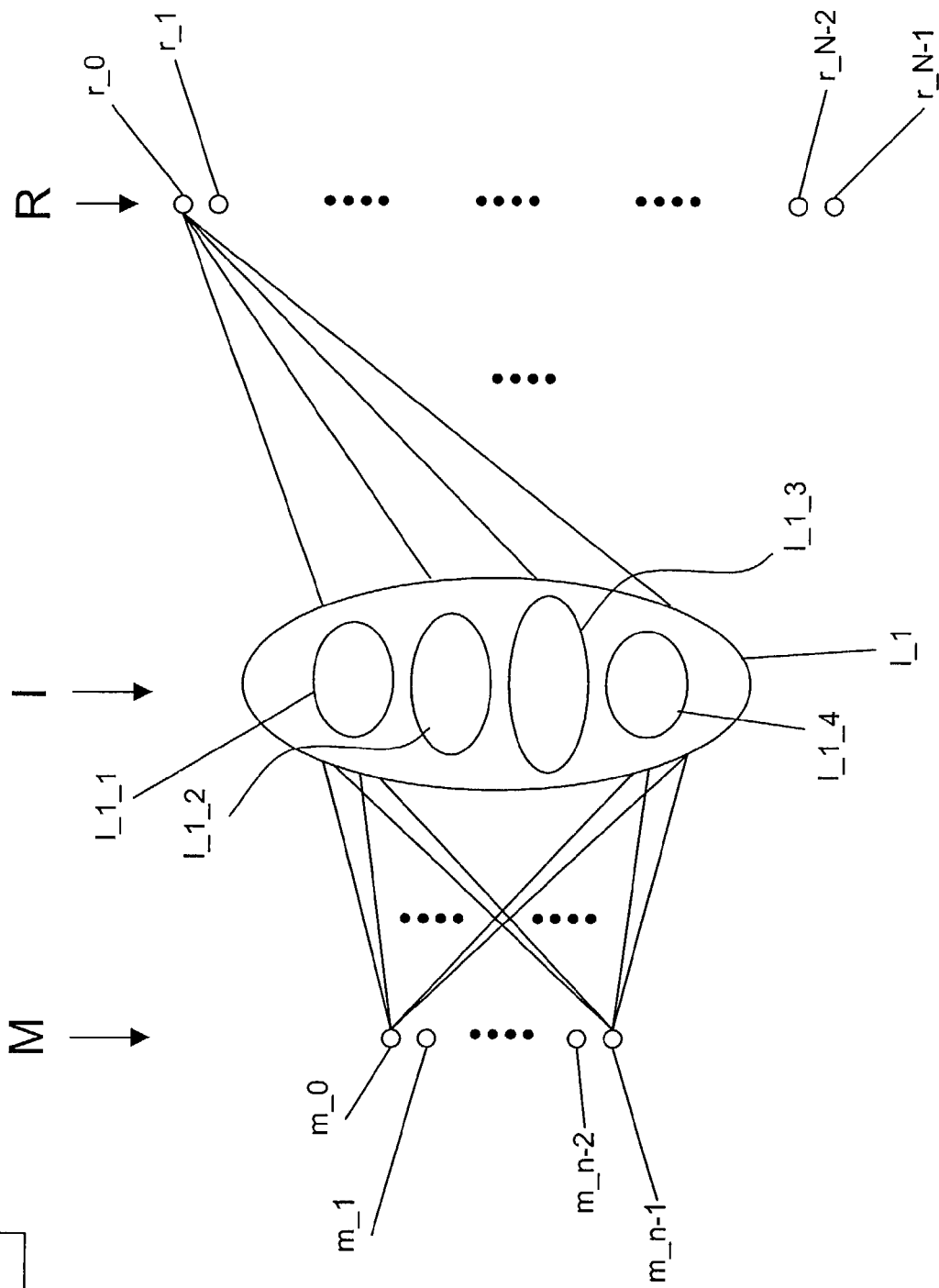
FIG. 2 shows a routing network obtained by performing the method corresponding to a first embodiment of the invention.

FIG. 2 shows a routing network similar to the routing network of FIG. 1. The intermediate level I of the routing network in FIG. 2 is divided into q=4 subsets I_1_1, I_1_2, I_1_3, I_1_4, which form a copy I_1 of subsets.

Each of the subsets I_1_1, . . . , I_1_4 contains a certain number of intermediate nodes, wherein an intermediate node must not be an element of two different subsets. The number of intermediate nodes per subset can vary from subset to subset.

The routing network as shown in FIG. 2 is obtained by choosing the parameters p and q appropriately and by partitioning the intermediate level I accordingly.

Moreover, to obtain a non-blocking routing network, each of the n=16 primary nodes m_0, m_1, . . . , m_n−1 is connected to each of the s intermediate nodes i_0, i_1, i_s−1. Since s is initially unknown, the steps (a) to (c) according to FIG. 4 must be performed beforehand.

The parameters p and q must be chosen such that the relation p*q≧sqrt(n) is satisfied with respect to the given number of n=16 primary nodes. sqrt(n) denotes the square root of n which in this case equals 4. If this relation is satisfied, the routing network created in the following steps is non-blocking which can be derived from Hall's theorem. Additionally, p>0 and q>1 must be obeyed.

With p=1 and q=4, said relation is obviously satisfied. Accordingly, the intermediate level I is partitioned into q=4 subsets I_1_1, I_1_2, I_1_3, I_1_4, which form p=1 copy I_1 of subsets, as already explained above. This is done in step (a) of the method depicted by the flow chart of FIG. 4.

Figures 4, 7A:
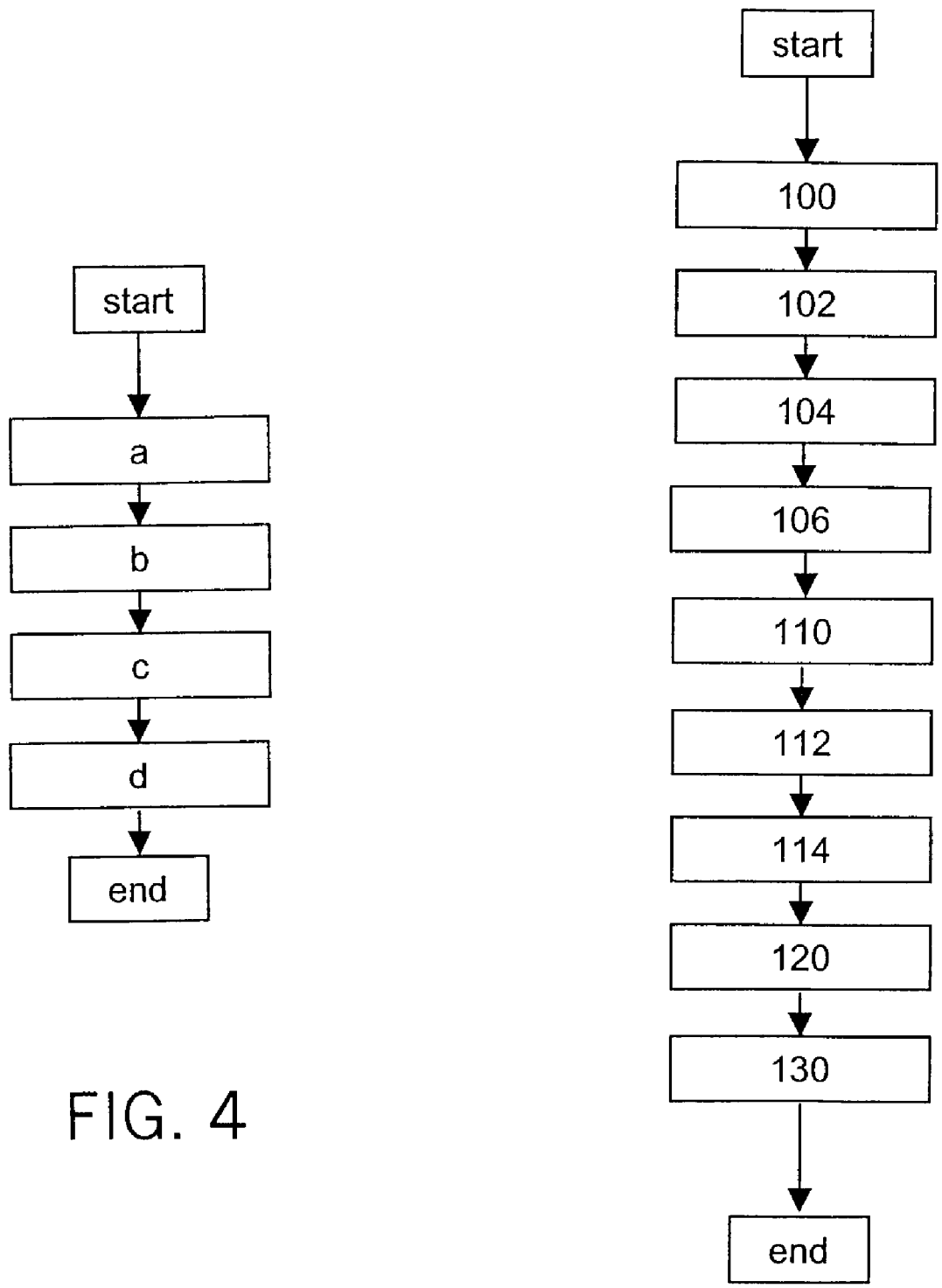
FIG. 4 shows a flow chart depicting the method according to the invention.
FIG. 7a shows a flow chart depicting a method of choosing connections for secondary nodes according to the invention.

In step (b) of FIG. 4, q prime numbers pn_1, . . . , pn_q and q functions f_a(x), a=1, . . . , q are chosen, wherein f_a(x)=x modulo pn_a; x denotes an arbitrary secondary node.

The functions f_a(x) provide a mapping from the secondary level R to the intermediate level I. More precisely, a function $f\_j(x)^k$ maps a secondary node x to the j-th subset I_k_j of the k-th copy I_k of said q subsets. In this case with p=1 and q=4, there are four functions $f\_1(\ )^1$, $f\_2(\ )^1$, $f\_3(\ )^1$, and $f\_4(\ )^1$.

The function $f\_1(x)^1$ maps a secondary node x to the first subset I_1_1 of intermediate nodes, the function $f\_2(x)^1$ maps a secondary node x to the second subset I_1_2 of intermediate nodes, and so on.

For evaluation of said functions $f\_1(\ )^1$, $f\_2(\ )^1$, $f\_3(\ )^1$, and $f\_4(\ )^1$, the r-th secondary node r_r−1 is defined to have the value r−1, for example r_0=0, r_1=1, . . . . Likewise, the r-th intermediate node i_r−1 is defined to have the value r−1, for example i_0=0, i_1=1, and so on. Applying $f\_1(\ )^1$ to r_0=0 with a first prime number pn_1=41 then yields $$f\_1(r\_0)^1 = 0\,\text{modulo}\,41 = 0,$$

which means that the first secondary node r_0 is mapped to the first intermediate node i_0 by the function $f\_1(\ )^1$. The second secondary node r_1=1 is mapped to a second intermediate node i_1=1 and so on. The secondary node r_40=40 is mapped to the intermediate node i_40, but the next secondary node, r_41, with r_41=41 accordingly, is mapped to the first intermediate node i_0=0 again.

As can be seen from these examples, the function $f\_1(\ )^1$ comprising, per definition, the prime number pn_1=41 performs a mapping to the first subset I_1_1 such that pn_1 many intermediate nodes i_0, i_1, . . . , i_40 are obtained.

Generally, by applying a function $f\_1(\ )^1$ to each secondary node, a number s_1_1 of intermediate nodes in the subset I_1_1 is obtained, wherein s_1_1=pn_1.

Evaluating a second function $f\_2(x)^1 = x\,\text{modulo}\,pn\_2$, mapping all secondary nodes to the subset I_1_2, results in s_1_2 =pn_2 intermediate nodes being member of I_1_2.

Correspondingly, each function $f\_a(x)^1$, a=1, . . . , q performs a mapping leading to a number s_1_a of intermediate nodes within a subset I_1_a of the intermediate level I, which number s_1_a is equal to the prime number pn_a used for the definition of the function $f\_a(x)^1$.

Regarding this, it is very easy to determine the overall number s of intermediate nodes required for the complete routing network: s=s_1_1+ . . . +s_1_q.

In case of p=2, q=4, which means that there are two copies I_1, I_2 of q subsets I_u_v, u=constant, v=1, . . . , q, there are also q functions $f\_a(x)^1$, a=1, . . . , q, performing the mapping from the secondary level R to the q=4 subsets I_1_1, I_1_2, I_1_3, I_1_4 of the intermediate level I.

Additionally, because of p>1, there are variants of said q functions $f\_a(x)^1$, a=1, . . . , q denoted by $f\_a(x)^2$, a=1, ..., q, which essentially do the same mapping. The only difference is the functions' index 1, 2 indicating to which copy I_1, I_2 of subsets I_u_v, u=constant, v=1, ..., q, the secondary nodes are mapped. A more detailed description of this constellation is given below with reference to FIG. 3.

Concerning the routing network of FIG. 2 with p=1 and q=4, when having chosen the q=4 prime numbers pn_1, ..., pn_4, the number s of intermediate nodes can be calculated. As stated above, each of the q functions $f\_a(x)^1$, a=1, ..., q is applied to a secondary node x thereby defining q mappings from that secondary node x to q different intermediate nodes belonging to q different subsets. Hence, the number of connections, which is derived from the mappings, can be obtained in the following manner:

For each of the N=2048 secondary nodes, q=4 mappings corresponding to q physical connections are defined. Thus, N*q=8192 physical connections exist between the intermediate level I and the secondary level R. For cases with p>1, for instance p=3, three copies I_1, I_2, I_3 of subsets must be considered. Since the mappings for each of the subsets are identical, the number of physical connections can be obtained by multiplication of N*q with p.

Additionally, the physical connections between the n primary nodes and the s intermediate nodes must be considered. Totally, a routing network according to the present invention requires s*n+q*N physical connections.

In the present example, the remaining prime numbers are chosen as follows:

pn_2=53, pn_3=59, pn_4=61.

With p=1, q=4, N=2048 and s=pn_1+pn_2+pn_3+pn_4=214, 11616 physical connections are required for the routing network. A conventional network without intermediate level I requires n*N=32768 physical connections. The routing network obtained by performing the method according to the invention is approximately 64% smaller, though it is also non-blocking and it is characterized by a transmission delay in the range of the theoretical minimum achievable with non-blocking routing networks different from the trivial solution.

To ensure a uniform distribution of physical connections between the intermediate level I and the secondary level R, the following rule for choosing appropriate prime numbers must be obeyed:

$$pn\_a*pn\_b \geq N*(1-\delta\_a\_b), \quad a=1, \ldots, q, \quad b=1, \ldots, q,$$

δ_a_b being Kronecker's symbol. For a=b follows pn_a*pn_a≥0, which is trivial.

For a<>b, pn_a*pn_b≥N must be satisfied. That is, the product of two different prime numbers pn_a, pn_b must be greater than or equal to the number N of secondary nodes.

Suppose pn_a=3 and pn_b=5 and N=16 thus deliberately violating pn_a*pn_b≥N. Function f_a will map a list of secondary nodes r_0=0, r_1=1, ..., r_15=15 to a first subset I_1_1 resulting in the following intermediate nodes: i_0=0, i_1=1 and i_2=2. For r_3=3, f_a again yields $i_{0=0}$, and so on. I.e., each pn_a-th, in this case each third secondary node is mapped to the same intermediate node i_v.

Accordingly, f_b maps each pn_b-th (fifth) secondary node to the same intermediate node i_w, starting with i_0=0. Consequently, each (pn_a*pn_b)-th (15th) secondary node is both mapped by f_a to the intermediate node i_v and by f_b to the intermediate node i_w. To pose it differently, for both intermediate nodes i_v and i_w, there is a set of connections provided by the above explained mapping, which set is characterized by consisting of physical connections to the same secondary nodes, namely each (pn_a*pn_b)-th (here 15th) secondary node. This advert effect is avoided by the method according to the invention resulting in a uniform distribution of physical connections.

An appropriate way to obtain prime number pn_1 is to choose the first prime number pn that satisfies pn≥sqrt(N), wherein sqrt(N) is the square root of N. For finding pn_2 starting with pn_1=pn, the next prime number pn' with pn'>pn_1 can be taken, and so on.

Since for the product pn_a*pn_b with a=b, it is only necessary to be greater than zero, in some cases it is possible to start with pn_a=pn'', wherein pn'' is the first prime number smaller than sqrt(N). However, in this case, too, pn_a*pn_b=pn''*pn_b≥sqrt(N) must be satisfied.

The method given above is an easy and uncomplicated way of finding appropriate prime numbers pn_1, ..., pn_q for defining the mapping functions f_1, ..., f_q.

For minimizing the number of physical connections between the intermediate level I and the secondary level R, it is possible to try different combinations of p or/and q or/and said q prime numbers pn_1, ..., pn_q. This process basically involves choosing the parameters p, q and finding q appropriate prime numbers.

Since p*q≥sqrt(n) is demanded, the number q of prime numbers to be found is proportional to the square root of the number n of primary nodes. Compared to N, n often is very small—as in the present case—which means that only few prime numbers must be calculated to be able to calculate the total number of physical connections required by the routing network.

Figure 3:
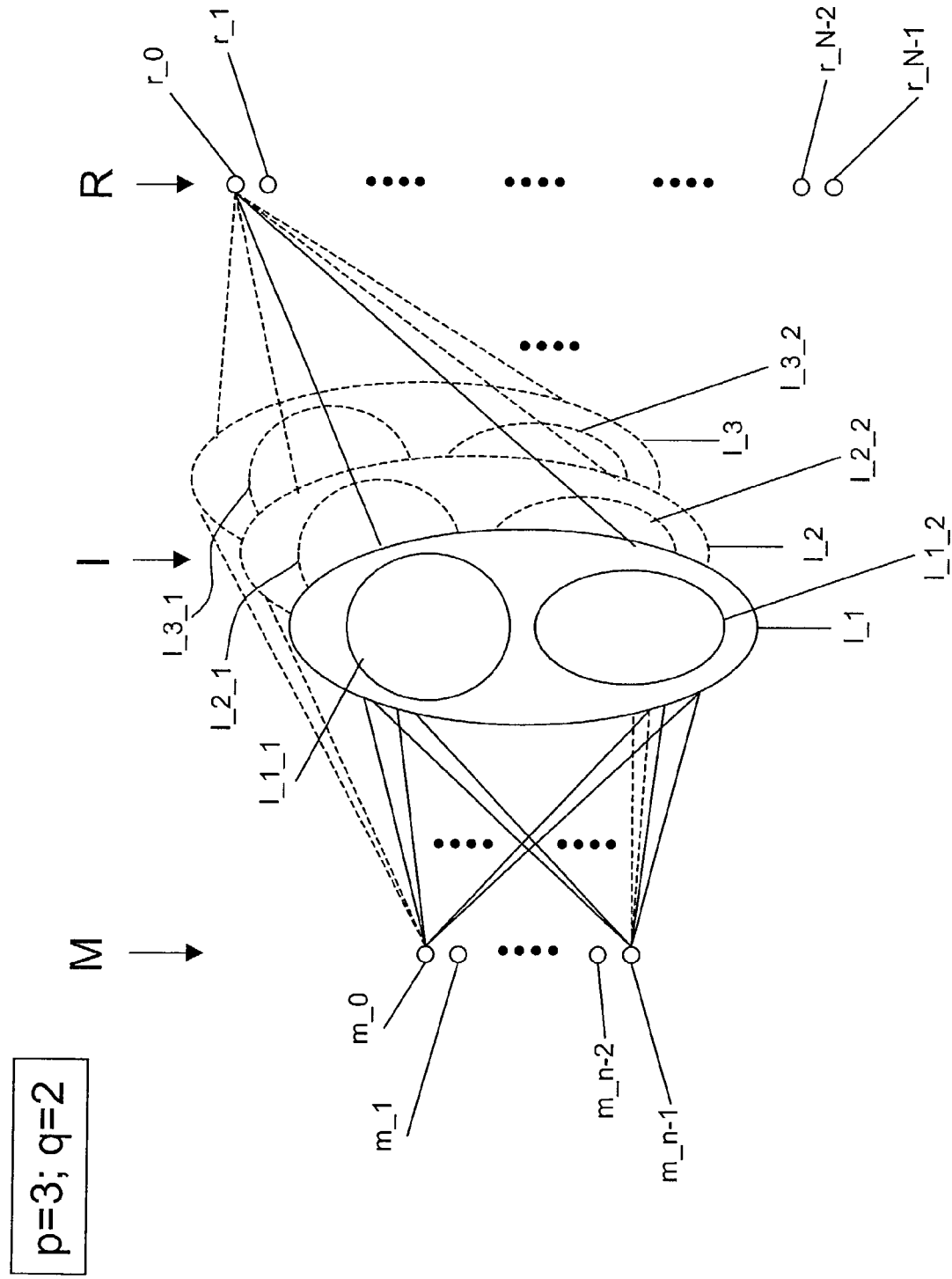
FIG. 3 shows a routing network obtained by performing the method corresponding to a second embodiment of the invention.
Figure 5:
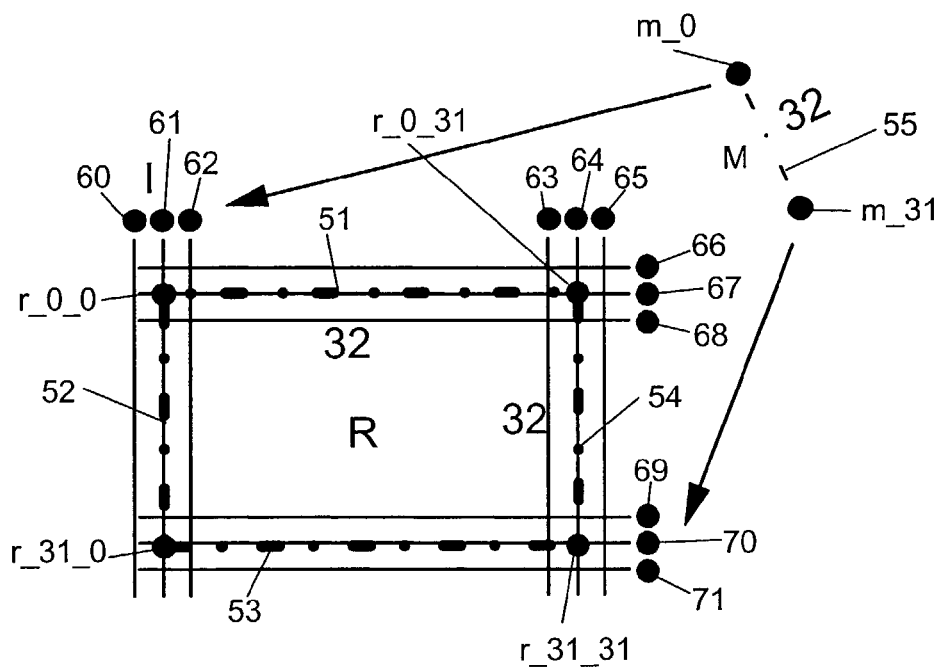
FIG. 5 shows a schematic drawing of the routing network of FIG. 3 in a matrix arrangement.

There are two drawings provided for explanation of the second embodiment of the invention. FIG. 3 shows the routing network obtained by performing the method corresponding to a second embodiment of the invention in a fashion already employed for disclosing the first embodiment of the invention which is appropriate since to some extent the second embodiment can be understood as an extension of the first embodiment. FIG. 5 provides a different view of the second embodiment of the invention and will be referred to in the further explanations whenever needed.

The structure of the routing network in FIG. 3 is similar to the structure of the routing network presented in FIG. 2, but the method of providing is quite different and has the advantage of enabling an easy hardware implementation, which is especially desirable for VLSI technology providing on-chip routing networks with unprecedented routing capacity.

The basic idea is to arrange the N=1024 secondary nodes of the secondary level R in a matrix form with m_r=32 rows and m_c=32 columns. A schematic drawing of said matrix form is shown in FIG. 5.

The secondary node r_0_0 being member of the first column and the first row of the matrix is displayed in the upper left corner of the matrix scheme. The chain-like lines 51, 52, 53, 54 symbolize further secondary nodes that are not shown.

Note that the N secondary nodes r_0 to r_N−1 of FIG. 3 are identical to the N secondary nodes r_x_y, x=0, ..., m_r, y=0, ..., m_c of FIG. 5. The different nomenclature is required for maintaining clarity when presenting the matrix scheme while at the same time being able to refer to the more formal arrangement of FIG. 3.

A detailed correspondence between the secondary nodes as shown in FIG. 3 and the configuration of the matrix scheme is not required for the further description, but it is possible e.g. to define the first 32 secondary nodes r_0, . . . , r_31 of FIG. 3 to be the members of the first row of the matrix in FIG. 5, and so on.

The n=32 primary nodes m_0, . . . , m_n−1 of FIG. 5 are represented by the first primary node m_0, the last primary node m_n−1 and a chain-like line 55 connecting both primary nodes m_0, m_n−1 and symbolizing the remaining primary nodes m_1, . . . , m_n−2. Intermediate nodes 60, 61, . . . , 71 are also shown in FIG. 5.

In the present example, the step (a) of partitioning (FIG. 4) is performed with q=2, i.e. two subsets I_u_1, I_u_2, u=constant, are defined in the intermediate level I.

These two subsets correspond to the row/column of the matrix. Accordingly, a first mapping function f_1 (r, c) is chosen that maps a secondary node r_r1_c1 of the r1-th row and the c1-th column of said matrix to the value r1 corresponding to an intermediate node in the first subset I_u_1.

Additionally, a second mapping function f_2(r, c) is chosen that maps said secondary node r_r1_c1 of the r1-th row and the c1-th column of said matrix to the value c1 corresponding to an intermediate node in the second subset I_u_2.

For instance, f_1 applied to the secondary node r_0_0 yields the value zero that corresponds to intermediate node 66. f_1 applied to the secondary node r_0_31 also yields the value zero that corresponds to intermediate node 66. f_1 applied to the secondary node r_31_0 yields the value n−1=31 that corresponds to intermediate node 69.

Likewise, applying f_2 to the secondary node r_0_0 yields the value zero for the column. This value corresponds to intermediate node 60. Applying f_2 to the secondary node r_0_31 yields the value n−1=31 for the column that corresponds to intermediate node 63.

Since the relation p*q≧sqrt(n) must be satisfied, the parameter p has to be chosen correctly. With N=1024 and n=32, p=3 is chosen which leads to three copies I_1, I_2, I_3 of the two subsets I_u_1, I_u_2, as can be seen in FIG. 3.

Referring to FIG. 5, p=3 means that a secondary node r_0_0 is not only mapped to the intermediate node 66 by the function f_1 ; r_0_0 is also mapped to two further intermediate nodes 67, 68. Accordingly, r_0_31 is also mapped to the three intermediate nodes 66, 67, 68 by f_1.

Likewise, f_2 maps a secondary node to three intermediate nodes. For example, applying f_2 to r_31_31 leads to a mapping of r_31_31 to the three intermediate nodes 63, 64, 65.

These mappings are symbolized in FIG. 3 by a line 301 denoting a mapping of a secondary node r_0 (that might as well be interpreted as r_0_0 ) to the first subset I_1_1 . The mappings of the secondary node r_0 to the copies I_2_1 , I_3_1 are symbolized by the dashed lines 302, 303.

Applying f_1 to each of the N secondary nodes yields 32 different values and thus 32 different intermediate nodes, which are in this case elements of the first subset I_u_1 , as already stated above. Associated with these 32 different values are 3* 32 different intermediate nodes, because of p=3.

In the same way, 32 different intermediate nodes for the second subset I_u 2 denoting the rows of the matrix, are obtained. The necessity of choosing p=3 leads to three identical copies I_1, I_2, I_3 of two subsets I_u_1 , I_u_2 each, so that the number s of intermediate nodes for the present example can be calculated as follows:

$$s=2*3*32=192.$$

Generally, there are s=p*q*m_r=p*q*m_c intermediate nodes for a quadratic matrix. Although it is possible to work with a non-quadratic matrix, i.e. m_r<>m_c, this variant is not described in detail, as it easily follows from the case of the quadratic matrix.

An intermediate node of a certain subset—due to the above mentioned mapping—is connected to every secondary node having the corresponding row/column number within the matrix. The number of physical connections between the intermediate level I and the secondary level R is s*m_r=s*m_c. In the present example, the intermediate node is connected to 32 secondary nodes, which yields 192*32 physical connections.

Finally, connecting each of the n=32 primary nodes to said s=192 intermediate nodes results in 32*192 physical connections from the primary level M to the intermediate level I. The complete routing network has 2*32*192=12288 physical connections which is significantly better than the trivial solution with 32*1024=32768 physical connections.

Figure 7:
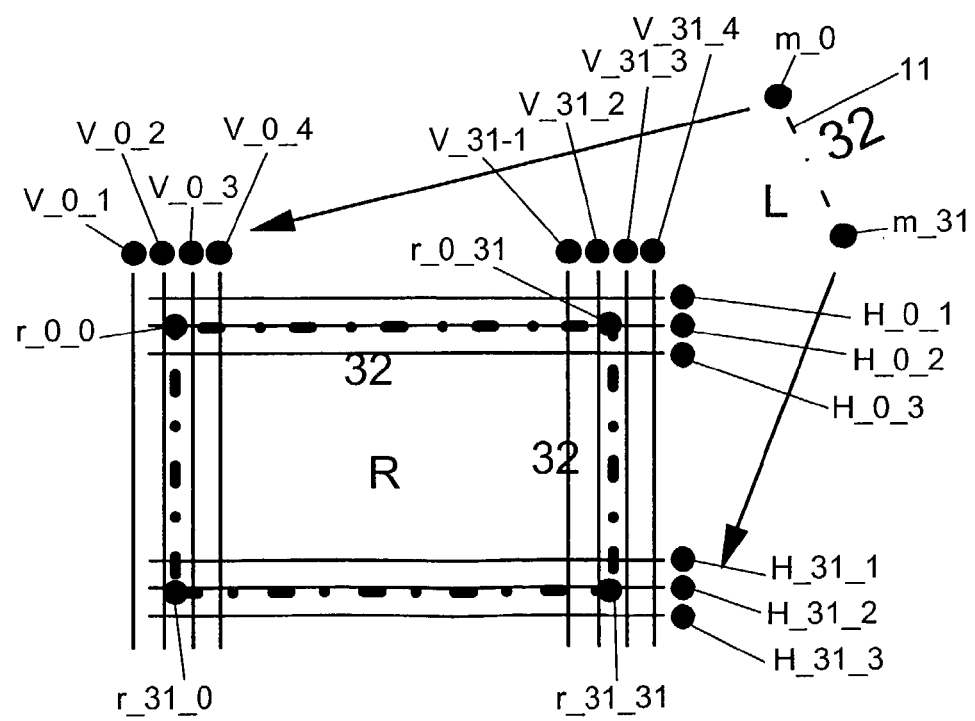
FIG. 7 shows in a matrix arrangement a schematic drawing of the extended routing network the intermediate level of which is displayed in FIG. 6.

FIG. 7 shows an extended routing network. In contrast to the routing network of FIG. 5 with three intermediate nodes 60, 61, 62 assigned to a single column of the matrix having N=1024 secondary nodes, the extended routing network of FIG. 7 comprises four intermediate nodes for each column of said matrix with N=1024 secondary nodes, wherein V_c_1, . . . , V_c_4 represent four intermediate nodes of the c-th column of the matrix.

Figure 6:
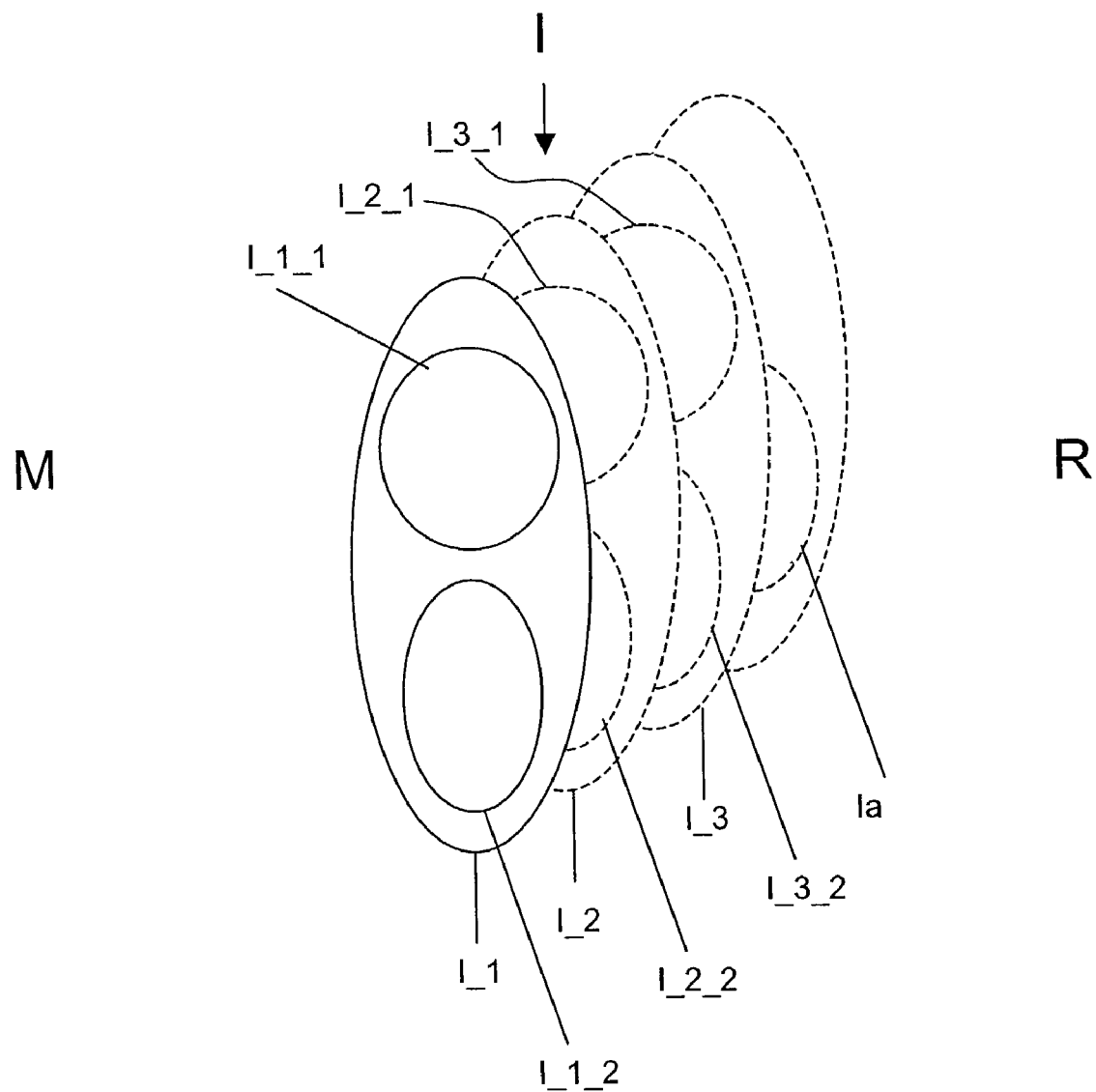
FIG. 6 shows the intermediate level I of an extended routing network.

The extension of the routing network is also illustrated in FIG. 6 in form of an additional set Ia of intermediate nodes. The primary level and the secondary level are represented by the letters M, R respectively.

The intermediate nodes constituting the set Ia of intermediate nodes shown in FIG. 6 are identical with the m_c=32 intermediate nodes V_0_4 , . . . , V_31_4 , which have been added to the routing network of FIG. 5 to obtain the extended routing network of FIG. 7.

To obtain the set Ia, a new mapping is defined that maps an arbitrary secondary node to an intermediate node corresponding to the column of said arbitrary secondary node in said matrix.

Altogether, each secondary node is mapped to four intermediate nodes associated with the column of said secondary node and to three intermediate nodes associated with the row of said secondary node. For example, the secondary node r_0_0 , which is in the first row and the first column of the matrix of FIG. 7, is mapped to the intermediate nodes V_0_1 , V_0_2 , V_0_3 , V_0_4 , H_0_1 , H_0_2 , H_0_3 . Hence there are seven connections between each secondary node and the intermediate level I. The intermediate level I itself consists of 7*32=224 intermediate nodes.

The overall number of physical connections for the extended routing network of FIG. 7 is 32*224*2=14336, because as with the previous example, each primary node has a physical connection to each intermediate node.

This still is significantly better than the trivial solution with 32*1024=32768 physical connections.

The extended routing network shown in FIG. 7 has the advantage of enabling an easy-to-implement way of routing data, i.e. of utilizing the physical connections for establishing links between the primary level M and the secondary level R.

According to the flow chart of FIG. 7a, the routing process starts with a step 100 of determining a set Xn' comprising n' secondary nodes x_1 , . . . , x_n'. In this case, n'=32 is chosen. For each secondary node of the set Xn', a link to a specific primary node has to be established which comprises finding a physical connection between the secondary node and a free intermediate node.

The set Xn' represents a one-dimensional arrangement of the 32 secondary nodes of the set Xn' and is especially useful for enumerating said secondary nodes. Nevertheless, the 32 secondary nodes of the set Xn' can be distributed all over the matrix of FIG. 7. Therefore, it is possible that there are columns or rows of the matrix containing different numbers of secondary nodes being member of the set Xn'.

For instance, it is possible that there are matrix columns/rows that do not have any member of the set Xn', i.e. for none of the secondary nodes in the respective column a link to an intermediate node has to be established. On the other hand it is possible that there are matrix columns/rows that have a plurality of secondary nodes which are member of the set Xn'.

After having determined the set Xn', in a next step 102 of FIG. 7a, a group G_4 of columns of said matrix is determined, the group G_4 being characterized by only comprising matrix columns that have four or less secondary nodes which are member of Xn'. Matrix columns that contain more than four secondary nodes belonging to Xn' are not regarded.

According to step 104, for each column of said group G_4 the four or less secondary nodes are assigned to the corresponding number of intermediate nodes of the respective column.

Suppose the secondary nodes r_0_0 , r_1_0 , r_7_0 and r_31_0 are member of the set Xn', i.e. the first column of the matrix of FIG. 7 comprises four secondary nodes of the set Xn' and is hence put into the group g_4 in step 102.

Then, in step 104, said first column is processed and the secondary node r_0_0 is assigned to the intermediate node V_0_1 , the secondary node r_0_1 is assigned to the intermediate node V_0_2, and so on.

The step 104 of assigning thus already defines the physical connection to be used for each secondary node contained in one of the columns of said group G_4 , so that in a subsequent step 106, each column of said group G_4 is marked as processed. A column marked as processed is not regarded any more in the routing process which can be interpreted as reducing the number of secondary nodes to be analyzed. This leads to a reduced matrix.

The reduced matrix comprises only those columns of the original matrix that contain five or more secondary nodes being member of Xn'. Since there are 32 elements of Xn', at maximum, there are six or less columns left in the reduced matrix. The number of rows m_r=32 has not yet changed. Correspondingly, the reduced matrix has 6*32=192 secondary nodes.

In the following step 110, a group R_3 of rows of said reduced matrix is determined. Only those rows of the reduced matrix which have three or less secondary nodes being member of Xn' are put into the group R_3.

Within step 112, the three or less secondary nodes of each column of group R_3 are assigned to the corresponding number of corresponding intermediate nodes of the respective row thereby defining the physical connections to be used for said three or less secondary nodes.

According to FIG. 7, the first row ranging from the secondary node r_0_0 to the secondary node r_0_31 has the corresponding intermediate nodes H_0_1 , H_0_2 and H_0_3.

The rows processed within Step 112 (FIG. 7a) are marked as processed in step 114 and are not regarded any further, which leads to a further reduction of the reduced matrix. After this, in step 120, the reduced matrix at maximum contains six columns and eight rows, which corresponds to 48 secondary nodes remaining. Either row of the reduced matrix contains four or more secondary nodes being member of Xn'.

Figure 8:
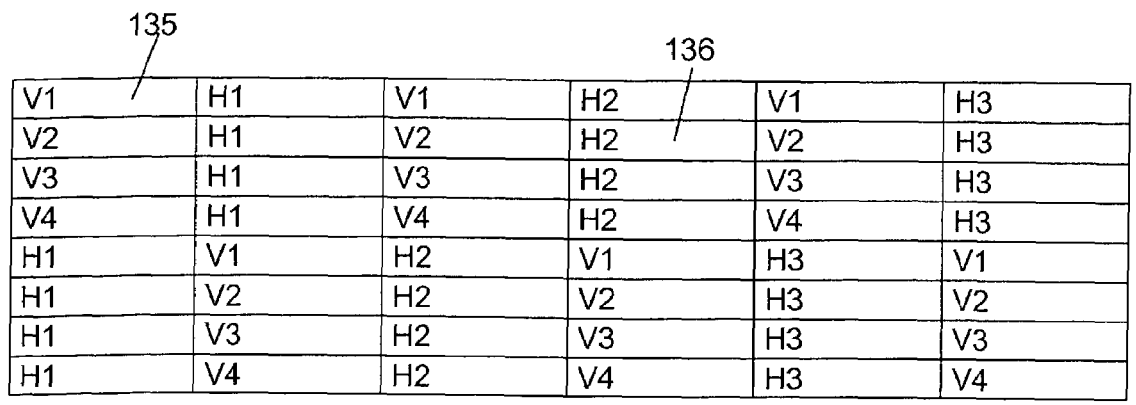
FIG. 8 shows a scheme 133 comprising assignment rules for a reduced matrix.

Finally, in step 130, the scheme 133 of FIG. 8 is applied to the reduced matrix. The scheme 133 has eight rows and six columns. Each of the 48 elements of the scheme 133 carries information on how to assign a remaining secondary node of the reduced matrix to a free intermediate node.

For assigning a specific remaining secondary node e.g. in the upper left corner of said reduced matrix corresponding to the first row and the first column of the matrix, the corresponding upper left element 135 of the scheme 133 is evaluated. This upper left element 135 contains the information "V1" which determines to connect said remaining secondary node to the intermediate node V_0_1 , wherein the index "0" is added for distinguishing between sets of intermediate nodes assigned to different columns. Accordingly, the index value "0" is chosen because the first column of said reduced matrix or scheme 133, respectively, is referred to.

Likewise, a distinct secondary node of the fourth column and the third row of said reduced matrix corresponds to the element 136 of the scheme 133 containing the information "H2" which determines to connect said distinct secondary node to the intermediate node H_2_2.

Generally, a "V" in an element of said scheme 133 determines to connect the element to an intermediate node that corresponds to the column of the element within the scheme 133. Likewise, a "H" in an element of said scheme 133 determines to connect the element to an intermediate node that corresponds to the row of the element within the scheme 133.

The number after "H" or "V" determines whether to choose the first, second, third or—in case of a "V" for a matrix column—fourth corresponding intermediate node.

The method is very simple and can be implemented in an embedded microprocessor. In contrast to known methods based on matching algorithms such as the Hopcroft-Karp algorithm, the method according to the invention does only need few machine cycles.

Figure 9:
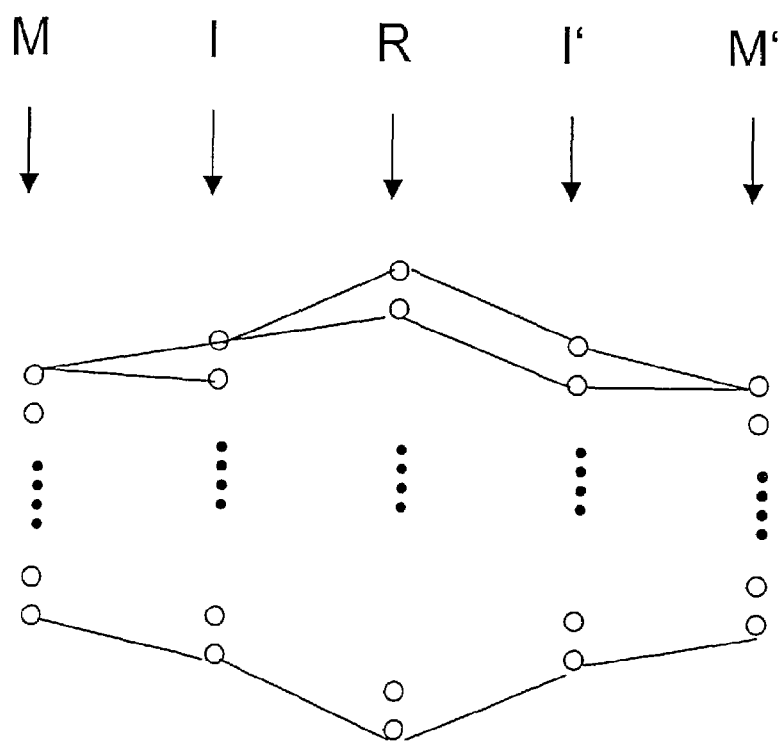
FIG. 9 shows a schematic drawing of a combined routing network.

FIG. 9 shows a combined routing network that can be obtained by combining two routing networks of the kind presented in the preceding examples.

The first routing network being part of the combined routing network comprises a primary level M, an intermediate level I and a secondary level R. The intermediate level I' is part of the second routing network, as well as the primary level M'.

Both routing networks are connected to each other via the secondary level R, which may comprise the secondary level R of the first routing network and the secondary level R' (not shown) of the second routing network.

The combined routing network is of special advantage if two sets of devices are to be connected to each other both of which have the same number of devices. However, is necessary for both routing networks forming the combined routing network to have the same number of secondary nodes in the secondary level R/R'.

This combined routing network is also non-blocking.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method of providing a non-blocking routing network having a primary level (M) with n primary nodes (m_0, m_1, ..., m_n−1) and a secondary level (R) with N≧n secondary nodes (r_0, r_1, ..., r_N−1) and an intermediate level (I) with s intermediate nodes (i_0, i_1, ... i_s−1), comprising the steps of:
   (a) partitioning said intermediate level (I) to obtain p copies I_u_v, u=1, ..., p; p>0 of q subsets I_v, u=constant, v=1, ..., q; q>1 such that the relation p*q≧sqrt(n) is satisfied, wherein sqrt(n) denotes the square root of n,
   (b) choosing functions f_1, ..., f_q defined for said secondary nodes (r_0, r_1, ..., r_N−1) of said secondary level (R) for mapping said secondary nodes (r_0, r_1, ..., r_N−1) to said intermediate level (I) such that
       (b1) f_a, a=1 ..., q, is an element of I_a, and such that
       (b2) the identity (r_y=r_z) of a first secondary node r_y with a second secondary note r_z follows from f_a(r_y)=f_a(r_z) and f_b(r_y)=f_b(r_z) for a<>b,
   (c) connecting each secondary node (r_0, r_1, ..., r_N−1) to p*q intermediate nodes, wherein for a distinct secondary node r_d said p*q intermediate nodes are given by the mapping of the functions f_1(r_d)$^1$, ..., f_1(r_d)$^p$, ..., f_q(r_d)$^1$, ... f_q(r_d)$^p$, wherein f_j( )$^k$ denotes a mapping to the j-th subset I_k_j of the k-th copy I_j of said q subsets, and
   (d) connecting each primary node (m_0, m_1, ..., m_n−1) to said s intermediate nodes (i_0, i_1, ... i_s−1).

2. The method according to claim 1, including
   providing q prime numbers pn_1, ..., pn_q in step (b) such that the relation pn_a*pn_b≧N*(1−δ_a_b), a=1, ..., q, b=1, ... q, is satisfied, wherein δ_a_b is Kronecker's symbol, the method further comprising
   choosing q functions f_a(x), a=1, ..., q, to be the residue class of x modulo pn_a, wherein x denotes an arbitrary secondary node, and
   using the mapping of said functions f_a(x), a=1, ..., q, for connecting in step c.

3. The method according to claim 1, further comprising choosing p and/or q such that the number of connections between said intermediate level (I) and said secondary level (R) is minimal.

4. The method according to claim 2, further comprising choosing said q prime numbers pn_1, ..., pn_q such that the number of connections between said intermediate level (I) and said secondary level (R) is minimal.

5. The method according to claim 1 wherein n=32 and N=1024.

6. The method according to claim 1, further comprising
   arranging said N secondary nodes (r_0, r_1, ... r_N−1) in a matrix with m_r rows and m_c columns,
   performing step (a) with q=2,
   choosing a function f_1(r, c) that maps a secondary node r_r1_c1 of the r1-th row and the c1-th column of said matrix to the value r1, choosing a function f_2(r, c) that maps said secondary node r_r1_c1 of the r1-th row and the c1-th column of said matrix to the value c1, and
   connecting each secondary node to p*2 intermediate nodes, wherein for a distinct secondary node r_r1_c1 said p*2 intermediate nodes are given by the mapping of the functions f_1(r_r1_c1)$^1$, ..., f_1(r_r1_c1)$^p$, f_2(r_r1_c1)$^1$, ..., f_2(r_r1_c1)$^p$, wherein f_j( )$^k$ denotes a mapping to the j-th subset I_k_j of the k-th copy I_k of said q subsets.

7. The method according to claim 6, wherein n=32, N=1024, and p=3.

8. The method according to claim 7 further comprising
   extending said intermediate level (I) by adding an additional mapping from said secondary nodes to said intermediate level (I) thereby defining an additional set (Ia) of intermediate nodes.

9. The method according to claim 8 further comprising
   choosing said additional mapping such that an arbitrary secondary node is also mapped to said additional set (Ia) of intermediate nodes, wherein said additional mapping maps said arbitrary secondary node to an intermediate node that corresponds to the column of said secondary node in said matrix.

10. A method of choosing connections for a set (Xn') of n' secondary nodes (x_1, ..., x_n') to intermediate nodes in a routing network arranged in a matrix with m_r rows and m_c columns, wherein four intermediate nodes V_c_1, ..., V_c_4 are assigned to a c-th column of said matrix with c=0, ..., m_c−1, and wherein three intermediate nodes H_r_1, ..., H_r_3 are assigned to an r-th row of said matrix with r=0, ..., m_r−1, comprising the steps of:
   determining a group (G_4) of columns of said matrix which contain four or less secondary nodes of said set (Xn') (102),
   for each column c found to be in said group (G_4) of columns:
       assigning said four or less secondary nodes to the corresponding number of corresponding intermediate nodes V_c_1, ..., V_c_4 of the respective column c (104), and
       marking said column c as processed thereby reducing the number of remaining secondary nodes and defining a reduced matrix (106),
   determining a group (R_3) of rows of said reduced matrix which contain three or less secondary nodes of said set (Xn') (110),
   for each row r found to be in said group (R_3) of rows:
       assigning said three or less secondary nodes to the corresponding number of corresponding intermediate nodes H_r_1, ..., H_r_3 of the respective row r (112), and
       marking said row r as processed thereby further reducing said reduced matrix and the number of remaining secondary nodes (114),
   obtaining said reduced matrix comprising eight or less rows and six or less columns of remaining secondary nodes that have not yet been assigned to intermediate nodes (120), and
   assigning said remaining secondary nodes to intermediate nodes according to a predefined scheme (133) (130).

11. An apparatus providing a non-blocking routing network having a primary level (M) with n primary nodes (m_0, m_1, ..., m_n−1) and a secondary level (R) with N≧n secondary nodes (r_0, r_1, ..., r_N−1) and an intermediate level (I) with s intermediate nodes (i_0, i_1, ... i_s−1), said apparatus comprising:
   (a) means for partitioning said intermediate level (I) to obtain p copies I_u_v, u=1, ..., p; p>0 of q subsets I_v, u=constant, v=1, ..., q; q>1 such that the relation p*q≧sqrt(n) is satisfied, wherein sqrt(n) denotes the square root of n, (b) means for choosing functions f_1, ..., f_q defined for said secondary nodes (r_0, r_1, ..., r_N-1) of said secondary level (R) for mapping said secondary nodes (r_0, r_1, ..., r_N-1) to said intermediate level (I) such that
  (b1) f_a, a=1 ..., q, is an element of I_a, and such that
  (b2) the identity (r_y=r_z) of a first secondary node r_y with a second secondary note r_z follows from f_a(r_y)=f_a(r_z) and f_b(r_y)=f_b(r_z) for a<>b,
(c) means for connecting each secondary node (r_0, r_1, ..., r_N-1) to p*q intermediate nodes, wherein for a distinct secondary node r_d said p*q intermediate nodes are given by the mapping of the functions $f\_1(r\_d)^1, \ldots, f\_1(r\_d)^p, \ldots, f\_q(r\_d)^1, \ldots f\_q(r\_d)^p$, wherein $f\_j(\ )^k$ denotes a mapping to the j-th subset I_k_j of the k-th copy I_j of said q subsets, and
(d) means for connecting each primary node (m_0, m_1, ..., m_n-1) to said s intermediate nodes (i_0, i_1, ... i_s-1).

12. The apparatus according to claim 11, further comprising
  means for providing q prime numbers pn_1, ..., pn_q in step (b) such that the relation pn_a*pn_b≧N*(1-δ_a_b), a=1, ..., q, b=1, ... q, is satisfied, wherein δ_a_b is Kronecker's symbol,
  means for choosing q functions f_a(x), a=1, ..., q, to be the residue class of x modulo pn_a, wherein x denotes an arbitrary secondary node, and
  means for using the mapping of said functions f_a(x), a=1, ..., q, for connecting in step c.

13. The apparatus according to claim 11, wherein p and/or q are chosen such that the number of connections between said intermediate level (I) and said secondary level (R) is minimal.

14. The apparatus according to claim 12 wherein said q prime numbers pn_1, ..., pn_q are chosen such that the number of connections between said intermediate level (I) and said secondary level (R) is minimal.

15. The apparatus according to claim 11 wherein n=32 and N=1024.

16. The apparatus according to claim 11 wherein
  the value of q=2,
  said function f_1(r, c) is chosen for mapping a secondary node r_r1_c1 of the r1-th row and the c1-th column of said matrix to the value r1, said function f_2(r, c) is chosen for mapping said secondary node r_r1_c1 of the r1-th row and the c1-th column of said matrix to the value c1, and further comprising
    means for arranging said N secondary nodes (r_0, r_1, ..., r_N-1) in a matrix with m_r rows and m_c columns, and
    means for connecting each secondary node to p*2 intermediate nodes, wherein for a distinct secondary node r_r1_c1 said p*2 intermediate nodes are given by the mapping of the functions $f\_1(r\_r1\_c1)^1, \ldots, f\_1(r\_r1\_c1)^p, f\_2(r\_r1\_c1)^1, \ldots f\_2(r\_r1\_c1)^p$, wherein $f\_j(\ )^k$ denotes a mapping to the j-th subset I_k_j of the k-th copy I_k of said q subsets.

17. The apparatus according to claim 16, wherein n=32, N=1024, and p=3.

18. The apparatus according to claim 17 further comprising
  means for extending said intermediate level (I) by adding an additional mapping from said secondary nodes to said intermediate level (I) thereby defining an additional set (Ia) of intermediate nodes.

19. The apparatus according to claim 18 further comprising
  means for choosing said additional mapping such that an arbitrary secondary node is also mapped to said additional set (Ia) of intermediate nodes, wherein said additional mapping maps said arbitrary secondary node to an intermediate node that corresponds to the column of said secondary node in said matrix.

20. An apparatus for choosing connections for a set (Xn') of n' secondary nodes (x_1, ..., x_n') to intermediate nodes in a routing network arranged in a matrix with m_r rows and m_c columns, wherein four intermediate nodes V_c_1, ..., V_c_4 are assigned to a c-th column of said matrix with c=0, ..., m_c-1, and wherein three intermediate nodes H_r_1, ..., H_r_3 are assigned to an r-th row of said matrix with r=0, ..., m_r-1, said apparatus comprising:
  means for determining a group (G_4) of columns of said matrix which contain four or less secondary nodes of said set (Xn') (102),
  for each column c found to be in said group (G_4) of columns:
    means for assigning said four or less secondary nodes to the corresponding number of corresponding intermediate nodes V_c_1, ..., V_c_4 of the respective column c (104), and
    means for marking said column c as processed thereby reducing the number of remaining secondary nodes and defining a reduced matrix (106),
  means for determining a group (R_3) of rows of said reduced matrix which contain three or less secondary nodes of said set (Xn') (110),
  for each row r found to be in said group (R_3) of rows:
    means for assigning said three or less secondary nodes to the corresponding number of corresponding intermediate nodes H_r_1, ..., H_r_3 of the respective row r (112), and
    means for marking said row r as processed thereby further reducing said reduced matrix and the number of remaining secondary nodes (114),
  means for obtaining said reduced matrix comprising eight or less rows and six or less columns of remaining secondary nodes that have not yet been assigned to intermediate nodes (120), and
  means for assigning said remaining secondary nodes to intermediate nodes according to a predefined scheme (133) (130).

21. A combined routing network having at least a first and a second routing network, each routing network being a non-blocking routing network having a primary level (M) with n primary nodes (m_0, m_1, ..., m_n-1) and a secondary level (R) with N≧n secondary nodes (r_0, r_1, ..., r_N-1) and an intermediate level (I) with s intermediate nodes (i_0, i_1, ... I_s-1) obtained by the method comprising the steps of:
  (a) partitioning said intermediate level (I) to obtain p copies I_u_v, u=1, ..., p; p>0 of q subsets I_v, u=constant, v=1, ..., q; q>1 such that the relation p*q≧sqrt(n) is satisfied, wherein sqrt(n) denotes the square root of n,
  (b) choosing functions f_1, ..., f_q defined for said secondary nodes (r_0, r_1, ..., r_N-1) of said secondary level (R) for mapping said secondary nodes (r_0, r_1, ..., r_N-1) to said intermediate level (I) such that (b1) f_a, a=1 ..., q, is an element of I_a, and such that (b2) the identity (r_y==r_z) of a first secondary node r_y with a second secondary note r_z follows from f_a(r_y)=f_a(r_z) and f_b(r_y)=f_b(r_z) for a<>b, (c) connecting each secondary node (r_0, r_1, ..., r_N−1) to p*q intermediate nodes, wherein for a distinct secondary node r_d said p*q intermediate nodes are given by the mapping of the functions $f\_1(r\_d)^1, \ldots, f\_1(r\_d)^p, \ldots, f\_q(r\_d)^1, \ldots f\_q(r\_d)^p$, wherein $f\_j(\ )^k$ denotes a mapping to the j-th subset I_k_j of the k-th copy I_j of said q subsets, and (d) connecting each primary node (m_0, m_1, ..., m_n−1) to said s intermediate nodes (i_0, i_1, ... i_s−1), said combined routing network comprising said first routing network and said second routing network having the same number of secondary nodes, and said first and second routing network being connected to each other via at least one secondary level (R).

22. The combined routing network according to claim 21, further comprising said first routing network and said second routing network having the same number of primary nodes.

* * * * *